(12) United States Patent
Blinder

(10) Patent No.: US 9,292,882 B2
(45) Date of Patent: Mar. 22, 2016

(54) SOCIAL CIRCLE BASED SOCIAL NETWORKING

(76) Inventor: Mark Blinder, Boca Raton, FL (US)

( * ) Notice: Subject to any disclaimer, the term of this patent is extended or adjusted under 35 U.S.C. 154(b) by 367 days.

(21) Appl. No.: 13/554,636

(22) Filed: Jul. 20, 2012

(65) Prior Publication Data

US 2013/0024516 A1  Jan. 24, 2013

Related U.S. Application Data

(60) Provisional application No. 61/509,805, filed on Jul. 20, 2011.

(51) Int. Cl.
| | |
|---|---|
| G06F 15/16 | (2006.01) |
| G06F 17/00 | (2006.01) |
| H04L 29/06 | (2006.01) |
| G06Q 50/00 | (2012.01) |
| H04L 12/58 | (2006.01) |
| G06Q 30/02 | (2012.01) |

(52) U.S. Cl.
CPC ............... *G06Q 50/01* (2013.01); *G06Q 30/02* (2013.01); *H04L 12/588* (2013.01)

(58) Field of Classification Search
CPC ................................ H04L 51/32; H04L 51/16
USPC .......................................................... 709/204
See application file for complete search history.

(56) References Cited

U.S. PATENT DOCUMENTS

| | | | | |
|---|---|---|---|---|
| 2009/0217342 | A1* | 8/2009 | Nadler | G06F 21/40 726/1 |
| 2012/0110052 | A1* | 5/2012 | Smarr | G06Q 10/10 709/201 |

* cited by examiner

*Primary Examiner* — Kevin Bates
*Assistant Examiner* — Emad Siddiqi

(57) ABSTRACT

Systems and methods of the present invention relate to the implementation of a novel social network. In one particular implementation, the invention includes transmitting contact data for displaying graphical representations of contacts for display to a first user, the contacts being contacts of the first user within a private circle in a computer-implemented social networking service; generating a first inner social circle corresponding to the first user, the first inner social circle comprising a first subset of contacts of the first user within the social networking service and defining a first distribution for digital content within that first inner social circle; and creating a sub-account by the first user, the sub-account corresponding to a second user, the sub-account being managed by the first and second users; wherein the second user becomes a member of the first inner social circle.

14 Claims, 11 Drawing Sheets

SOCIAL CIRCLE BASED SOCIAL NETWORKING

CROSS-REFERENCE TO RELATED APPLICATION

This application claims the benefit of U.S. Provisional Application No. 61/509,805, filed on Jul. 20, 2011, the entirety of which is incorporated herein by reference.

BACKGROUND OF THE INVENTION

1. Field of Invention

This invention relates to the field of social networking, and, in particular, to a system for a social circle based social networking and social gaming.

2. Description of Related Art

Social networking, such as establishing professional or personal affiliations (e.g., friendships), may be supported by an online social network. In general, online social networks can include social network members (e.g., individual network users) that typically have a member profile for each member/user. The user can use the profile to convey information about himself/herself to other users. For instance, the profile may be accessed or viewed through an associated application, such as a web browser on the Internet accessing web pages from one or more social networking web servers. These member profiles may be interrelated through associations (friendships), such that a specific member's profile may be accessible to other members of the network (e.g., the member's friends) based on policies in place on the profile and any related associations.

Members of a social network may establish an affiliation with one or more specific groups (i.e., sub-networks of members within the social network), which may have a separate group profile to convey information about the group (e.g., what the group is, who its members are, etc.). In particular, in addition to sharing affiliation in the group (e.g., sharing similar interests, businesses, organizations, etc.), members of a group may access the profiles of other members of that same group based on group policies. Typically, affiliation with a particular group occurs on an individual member basis; that is, to be affiliated with a group, each member must individually seek such affiliation. Currently, online social networking groups go no further than member affiliation within groups, group profiles to provide information about the group, and a listing of the group's members. Individual users can also create groups and join groups.

An example of such a social networking system is disclosed in U.S. Patent Publication No. 2009/0030985 A1, filed by Zheng Yuan on Jul. 24, 2008. The Zheng system discloses a system for family based online social networking. In the Zheng system each family has family members, a family profile, and a family policy, either the family profile provides information about the family to members of the social network. The family policy defines the accessibility of the information about the family within the social network. Different families may be associated as family friends, such that each member of one family may access the family profile of another family provided that the families are family friends.

U.S. Patent Publication No. 2009/0313291 A1, filed on Jun. 22, 2009 by Emily White, discloses a method and system for establishing and using a social network to facilitate people in life issues. The White system is directed to resolving life issues that arise when individuals or families relocate, including logistic problems, assimilation of family members in a community, and roommate pairings. Additionally, it is directed to facilitating corporations in relocating their employees, and assisting employees and their families U.S. Patent Publication No. 2009/0217342 A1, published on Aug. 27, 2009, provides additional background. All references cited herein are incorporated herein by reference in their entireties.

In May 2012, Associated Press reported that registered sex offenders who have been banned from social networking websites are successfully challenging in U.S. courts many of the restrictions related to the social network bans as infringements on free speech and their right to participate in common online discussions. In light of the fact that U.S. courts and state laws cannot properly protect children's profiles from being accessed by registered sex offenders, there is a really important need in the art for a social network system that can provide safeguards to protect children and families.

BRIEF SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment, the social networking system of the invention can be centered around a social circle, such as an inner circle social circle. Private posting for the members of the inner circle is permitted. The inner circle social circle can be linked to one or more other inner circle social circle(s), including but not limited to other family group "inner circles." The linking of one inner circle social circle to another inner circle social circle can include a selection of some or all inner circle members taking part in the new social outer circle connection. The outer social circle includes private postings for the opted in members of all the "inner circles" that are linked in this outer social circle connection.

The inner circle social circle networking system of the invention can permit multiple connections, such as multiple examples of the foregoing connections. For example, an adult user in an inner circle social circle can connect his/her inner circle social circle to the inner circle social circle of his/her sibling(s), and to an inner circle social circle of his/her parent(s), thus forming an outer social circle. An adult user can connect his/her inner circle to the inner circle of his/her inner circle social circle adult user partner's sibling(s) and/or parent(s) inner circle social circles. It is also possible to connect the inner circle social circle of a user to the inner circle of a friend or friends, and to any members of an extended family. Messages within each of these separate "inner circles" social circle connection groups are private to the members of that inner social circle group. Each inner social circle is then a separate and distinct entity and all data is contained within a specific social circle microcosm and is not available to members not admitted in the "inner circle." However, members of the outer social circle can exchange messages between each other. In other words, only members of an inner circle can post messages to a private wall associated with that inner circle, for example, but they can also post messages in a separate wall corresponding to an outer circle which can be seen by the members of the outer circle. However, unless a member of an outer circle is also a member of a particular inner circle, that member cannot view messages posted in the inner circle wall, for example.

Child accounts in the inner circle social networking system of the invention can have limitations. The limitations can be based on parent administrative settings within parent accounts. Parent accounts can have any desired options, including administrative rights of the family inner circle, and rights for approval of friendship requests and other requests from associated child accounts. The options within the parent accounts can also include privacy control of groups, private (invite only) groups, and public groups. League/tournament groups with gaming features including leader boards and scheduling can also can also be controlled within the parent accounts.

Parental controls in the inner circle social networking system of the invention can be accomplished with separate logins in order to provide a parental approval system for helping the parent to control linking requests, group join requests, game play requests and any other types of requests. The parental controls also permit parental privacy supervision of settings such as privacy settings of each associated account or subaccount, settings of public viewing of information from each associated account, and postings. The parental control of posting, or any other setting, can be made selectively available. For example, control of postings can be limited for children under a specified age. Any of these features can have an on/off switch controlled by the parent account. Parental controls can also be used to provide action incentives. For example, an action incentive can be an online currency, wherein a grandparent can offer a child an online currency which could be used to purchase various system upgrades or parentally approved merchandise available through the site implementing the social network of the present invention.

The following description and the annexed drawings set forth in detail certain illustrative aspects of the invention. These aspects are indicative, however, of but a few of the various ways in which the principles of the invention may be employed, and the present invention is intended to include all such aspects and their equivalents. Other advantages and novel features of the invention will become apparent from the following detailed description of the invention when considered in conjunction with the drawings.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF ILLUSTRATIVE EMBODIMENTS OF THE INVENTION

Figure 1:
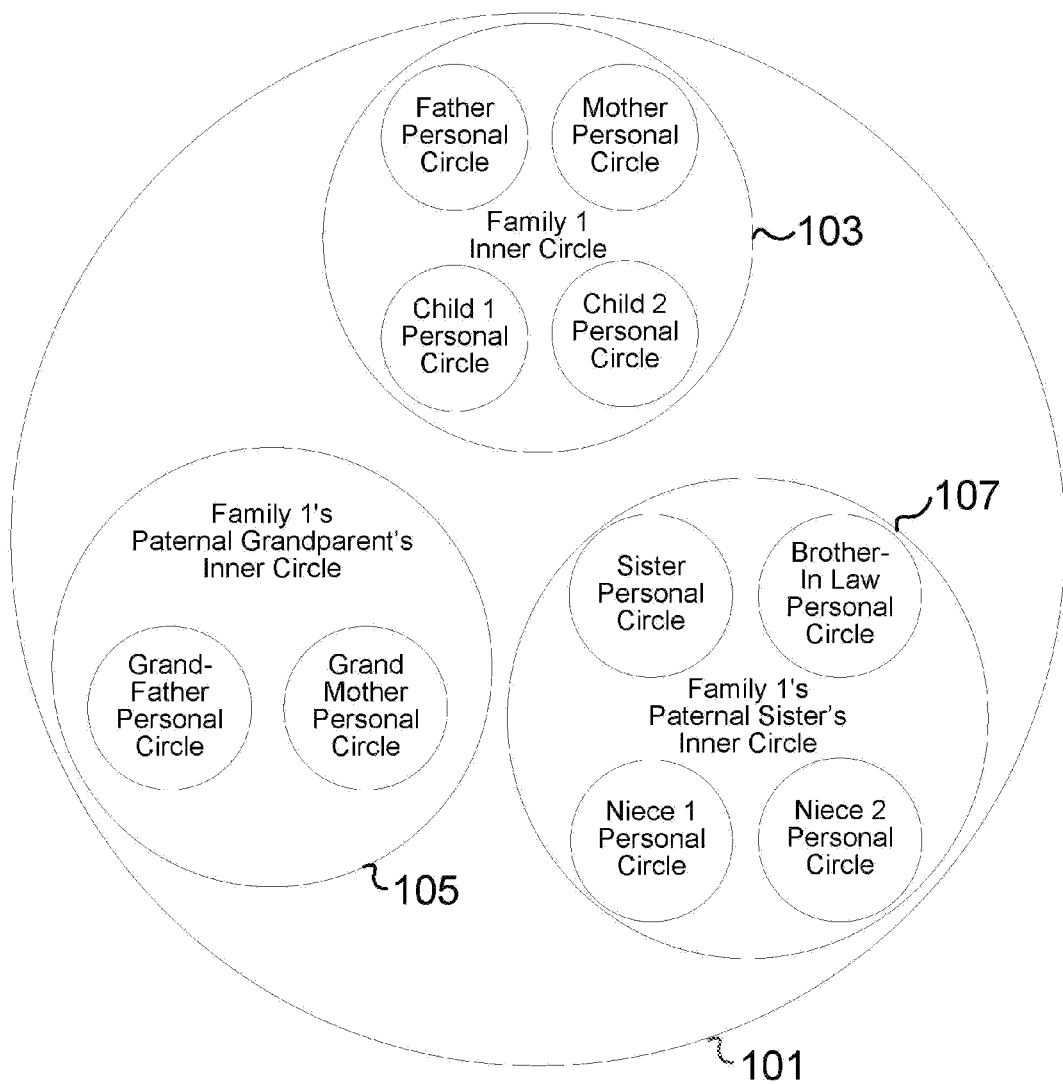
FIG. 1 shows interconnections of inner social circles forming an outer circle according to one embodiment of the inner circle social networking system of the invention.

The foregoing summary, as well as the following detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout.

The various embodiments and/or components, for example, the modules, elements, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

In one embodiment of the inner circle social networking system, the information regarding the members of the system and the relationships between the members can be stored in a database or databases, for example on database servers. The database or databases can have any database layout known to those skilled in the art. The well known Microsoft SQL Server or any other information management or database management tools, can be installed and configured for this purpose.

A general account within the inner circle social networking system of the present invention can be defined as a user who has not yet registered on the social networking system site. Such a general account user of the site can also be referred to as a casual user. Casual users can be, for example, new users who just found the site and want to explore it, or people returning to the site that have not yet decided to sign up. Users with this account type can browse the site, play single player games, but will have very limited accessibility to the social networking system of the site.

One attribute of the general account can be permission to access and play single player games only. Also, users with a general account may be permitted to at least view the multiplayer section. The scores of users with general accounts may not be saved or recorded. Viewing of advertising throughout the site may also be permitted. While such users may be permitted to view some basic profile information, they may be required to register in order to be permitted to interact with any other users.

A registered user account in the inner circle social networking system of the invention can be defined as a user that visits the site, and creates a user profile by filling out and submitting a registration form provided by the site. The registration information of the user can therefore be stored in the database or databases of the inner circle social networking system.

When the user registers for a registered user account, the user is prompted to provide user information. The user information can include first name, last name, middle initial and a desired username. The inner circle social networking system can verify the username requested by the user for uniqueness and to prohibit profanity. The system can also verify that the user has no criminal record in accordance with one embodiment of the invention. The user can also be prompted to provide a password and address information, such as a street address, a city, a state and a zip code. Date of birth, gender and source IP address can also be requested in order to obtain registration. The system may also obtain information regarding the referring URL, the date and time the account is created, the date and time the account is modified, an email address, the subscription start and subscription end dates, trial logins, credit card information, join to email sent table, referred by (user entered, or auto entered), or any other information that may be useful for performing the operations and functions of the system. The account can be designated as validated and active.

When a registered user account is created it can have any relevant account attributes. The user can be required to register and confirm the email address provided during the registration via a double-opt in, and may be prevented from generating a private group. For example, the present invention includes social groups, as in other social networking site, but in one embodiment of the invention a registered user can't create private groups, though he or she can join them if invited by other users. The user may be permitted to join a predetermined number of private groups by invitation only. The total number of groups a registered account may be permitted to join may be a global variable which is set on a site wide basis via the administration area. Additionally, the user may be permitted to join an unlimited number of public groups, to play multiplayer games, and to have game play statistics stored. In one embodiment of the invention, children who are registered users are not allowed to join public groups. In another embodiment, children of age thirteen and under can't use the site's social and chat features if they are not tied in to an inner circle. In one embodiment, children are only allowed to join one inner circle, namely, the circle corresponding to the children's household. In another embodiment, children of divorced parents may join two inner circles, namely, the inner circles associated with the father and the mother.

Viewing of other user profiles and access to the communication tools on the site may also be permitted. Access to premium games can be blocked. An option of using a preset avatar from a library of avatars or uploading a user-provided custom avatar is provided. In one embodiment of the invention there may be age restrictions for signup. Users over thirteen years of age may create a solo account without parental permission. Users must be eighteen or over for a premium account. In general, the attributes of the registered user account of the inner circle social networking system of the invention can be substantially similar to registered user accounts in other major social networking sites. In one embodiment, registered users do not have any access to the social circle connections portion of the web site, such that, for example, registration as a premium user would be required to create and link inner circles to form outer circles. In accordance with another embodiment, premium users can also access premium games, create leagues, and create tournaments.

The premium user account can be the premier account within the inner circle social networking system. This can be an account with access to all the features on the site. In addition this account type can give the user access to all of the parental control features that are offered in the inner circle social networking system. The premium user account can create subaccounts. For example, a parent having a premium user account can create a subaccount for a child. The number of subaccounts that can be created by a premium user account can have a default value, for example three subaccounts. The default value can be a global value for all premium user accounts in the inner circle social networking system. Users with premium user accounts can be permitted to upgrade the account allowing the addition of more adult and subaccounts. The features of subaccounts are defined in more detail below.

The premium user account can create a number of private groups. The number of private groups that can be created can be controlled via a global variable set by the administrator of the inner circle social networking system. Such a user can receive ego boosters throughout the site. The ego boosters can include featuring the user name, and highlighting the user name when it is shown throughout the site to indicate that the user is a premium member. Furthermore, this can entice others to follow suit and become premium members. Users can be prevented from viewing any non-site related banner advertisements. Any banners on the site can be internal ads promoting games, new features etc. Premium users can have access to games designated as premium games. They can create leagues and tournaments. They can have an inner circle, and create or join any number of outer social circles. Suggested optional outer social circles are: an extended family social circle, and a close friends and families social circle.

As mentioned, a subaccount may include or may be referenced herein as a child account. The purpose of the subaccount is to give the ability for premium user accounts in a preferred embodiment of the invention to provide adult guidance and create a safer social networking and online gaming environment for the child accounts, and to grant children with subaccounts access to certain aspects of the inner circle social networking. In an alternative embodiment, registered users can have the same privileges described in this document with respect to premium users. The child account can have attributes based on parental security choices. Initially child accounts come locked down with the most stringent security settings. Some or all of the restrictions can be removed from a child account by the adult user account. Thus, the user of a subaccount can have limited access to games based on security settings set forth by a parent account. In a preferred embodiment, all aspects of the child account can be managed by the parental controls. Accordingly, when the child account attempts to access different areas of the site, a determination can be made by the system whether the subaccount is allowed the action based on adult account parental settings before proceeding.

A user with a child account can create a pre-determined number of private groups, wherein the pre-determined number can be a global variable. A user with a subaccount can communicate only with approved friends and outer circle members of outer circles that they are a part of. Furthermore, such a user's personal information does not show up in the results of a site wide member search, just the name and some other very limited information is allowed to come up in site wide searches. In a preferred embodiment only the nickname and age of a child are required to create a subaccount. If a child chooses a nickname that has already been taken, possible alternate nicknames can be suggested by the social network engine. The child profile is locked from public view by default, in accordance with one embodiment.

A profile can be created for a user by the social networking engine components of the inner circle social networking system. Initial fields can be provided for this purpose. The initial fields can include game statistics, high scores, ratings and avatar or profile picture. This information can be stored in the system database and pulled from the system database in order to populate the fields as needed.

The actual search functionality for the inner circle social networking system can be similar to the search functionality of other known social networking sites. In this functionality, when a user types a query into the search, all available areas of the site can be searched. This can include: my friends, system members, games and leagues. The searching performed in the system of the invention is subject to all of the restrictions and rules provided to protect the privacy of child and adult users. For example, child user profiles will only show up in a search if they are within linked family networks of the account performing the search. Furthermore, adult users can have the ability to modify their privacy settings so that they do not show up in search results. The results of the search are then presented in a sorted format to the user so that the user can click into the desired destination. The search functionality can have any further restrictions and requirements desired.

Figure 11:
FIG. 11 illustrates an exemplary parental control management interface in accordance with one embodiment of the present invention.

In one embodiment the parental control system can be accessible only by paid registered members. This serves as the parent's main control panel allowing them to administer their child subaccounts and monitor some of their child's social networking activity. The parental control panel can have features and functionalities such as a subaccount management screen. This feature can allow parents to add, remove, or modify all the associated child subaccounts via a simple to use system. An exemplary management screen is illustrated in FIG. 11. This grid system can list all the account names and allow the adult user to click into the account and modify them if desired.

In the parent control administration functionality, once a parent is inside the subaccount management section, the parent can have the ability to monitor activity as well as to set up limitations on the subaccount. For example, the parents can remove friends connected to their child, edit their child's posts, and monitor the child's activity. Parents can have the ability to restrict and manage access to areas of each subaccount such as: private and public groups, private messaging, friend requests, single player and multi-player games, public member forums. They can also restrict which family members are auto approved for connection to the child user account without the need for adult user account approval. This feature can be used, for example when two families link up. The parents can choose to remove certain members from the auto approve list.

In one embodiment, all restricted content can go through the same approval process, so that there is no confusion on the part of the parent. In this process a child can request access to any type of restricted content, and the parent can receive notification of child requesting access. The parent can navigate to the access notifications tab and either approve or deny the request. The child can then receive notification of the results and be provided with a link back to where he or she left off, for example a game, a friendship request, a forum post, etc. A child receiving an approved friend request, or another person on other end, is then shown the friend request to approve.

Thus, in one embodiment, if two child subaccounts request to be friends with each other, parents on both ends must approve before the connection can be made. In a preferred embodiment, parents can have the ability to select which notifications they want to receive by email. Alternatively parents can login to the subaccount administration area and view all notifications.

In one embodiment of the invention a child from a first inner circle may request to become friends with child from a second inner circle. The friend request would have to be approved by at least one of the parents of the requesting child. If the request is denied, the requesting child can appeal the decision. If the request is approved, then the request goes to the child from the second inner circle. If the second child accepts the request, then the request goes to the parents of that second child for further approval. If a parent approves the received request, then a friendship is formed between the two children.

Third party tools can be used to allow users to import their contacts from Gmail, Yahoo, Hotmail and other free email services with the intent of inviting them to into the inner circle social networking system. Once the user imports the contacts, the inner circle social networking system may send a message from the user importing the contacts inviting them to join the site. This feature can function in a manner substantially similar to how known major social networking sites function.

All users of the inner circle social networking system can have access to a central message board allowing them to talk about any off-topic items such as sports, movies, music etc. This can increase traffic to the site and give users a reason to come back. Users can have the ability to subscribe to a topic so that if a new message is posted they can be notified. In one embodiment, by default child accounts do not have access to the public message board. Administrators of the inner circle social networking system can have the ability to designate moderators for the forums to help manage and maintain them.

Gaming functionality and statistics in the inner circle social networking system can use areas in the system database to store information such as game play history, single-player game statistics, multi-player game statistics, score logs, time in game history and opponent history. In addition, the site can automatically gather game play usage for display on the profile of the user. This data can be used for favorite games, automatically showing the games that were played the most by that user, game statistics, a running tally of total time spent playing games and total score, and a recently played games list that can be automatically generated and posted to the wall of the user. Users can view a full history of played games when viewing others profile. This data can be gathered by way of pre-load and post-game pages.

A main leader board, which can be referred to as a site wide scoring leader board, can be created for displaying up to date statistics for users to view. This can permit users to see information such as the top scores of the day, the most played games, the most active users, and any other data driven definition desired.

Full instant messaging capability video chat, voice chat and others can be supported in the inner circle social networking system by integrating third party systems from selected vendors. For example, CometChat or Smart Fox Server can be used. Game chat functionality is also provided in the preferred embodiment in order to allow users to chat with their opponents during games. An initial limit can be placed on the number of simultaneous players permitted in a game. This limit can be modified by a parent or, if multiple child subaccounts are involved in the game, by the parents of all of the participants.

Other social networking components can also be permitted. These components can also be governed by user account type and parental controls. The components can include public profile creation for allowing the user to create a standard profile telling other users of the site about themselves and their interests. The public profile can include a main member photograph, and/or a photograph gallery allowing member to upload up to, for example, one hundred photographs. Members can have the ability to create separate photo albums and select who has access to view them.

The public profile can also include demographic information which can be stored in a separate private database, first name, last name, email address, phone, gender, date of birth, address1, address2, city, state, zip, username and nickname. User activities can also be included in the public profile. The user activities can include, last login date, member since date, login frequency, last game played, etc. Login frequency can be defined as tracking all logins that occur on the site so it can be determined who the most active users are.

Member blocking can be provided to allow a user to block any other member from interacting with them or their supervised subaccounts via any of the communication tools on the site. Bookmarking/favorites can be provided to permit members to bookmark games to mark as their favorite. Additionally, private messaging can be provided to allow members to send private messages to each other. Accordingly, each user of the site can have access to, for example, an inbox, sent items and trash. A friends network can permit members to invite their friends to their own private network. Additionally, this feature can work in a manner substantially similar to adding friends on other major social networking sites, etc. Private wall/blog functionality can be provided in order to allow members to interact via a wall/blog that other friends can see.

An administration area can be provided in the inner circle social networking system as the main administrative area to permit an overview of the statistics of the site. Some of the information displayed can include sign up rate, current members, current paying members, etc. In a preferred embodiment, the inner circle social networking system can display this information in a dashboard format. In addition the administrator can have the ability to look up and modify member profiles. Banner (advertisement) administration can also be provided. This can allow the administrator to setup different zones in the site for banner advertising. Banner advertisements can be rotated based on the different zones and demographics. Third party banner management software can be used to perform these operations. All billing and accounting activity for the inner circle social networking system can be handled by a billing system. The billing system can be basic in structure but can allow for additional scaling and new features.

The inner circle social networking system can also include any number of subscription packages. For example, it can include several flat fee packages that can be billed monthly. These can include level one basic, which can include some squibbles (virtual currency), some child accounts, some league and tournament capability. Level two can include more squibbles, more child accounts, and more league and tournament capability. Level three can include the most squibbles, the maximum number of possible child accounts, and the maximum possible league and tournament capability. It should be customizable on the administration site. Thus, the three account levels can have the same access. The major difference is the level of squibbles they receive, the child accounts they have, and the number of leagues they can create.

Additional recurring fees can be added to the subscription. For example, subaccounts, more leagues and additional squibbles can be purchased. The costs of the monthly subscriptions can be controlled via the administration. Up sells can be available throughout the site as additional monthly fees. The upsells can include premium games, the site shop, tournament entry fee and tournament creation fees. The customer credit card can be billed in real time through an Internet gateway/merchant account. The billing activity can be logged in the database and accessible via the administration area of the site. The recurring billing module can run as a windows service on one of the servers. The billing system can be setup for future expansion allowing for multiple billing packages (for example $19.99 per month, $24.99 per month etc.). The league functionality of the inner circle social networking system allows leagues to sign up and create tournaments, and to replicate as much as of the conventional league and tournament functionality as possible. An example of this is the league hosting feature that may be made available through the inner circle social networking system. Leagues can be implemented as another form of groups, and they can have access to all the features the normal groups have. In addition leagues can have their own landing page. This can be substantially like a mini website of its own.

The administrator of the league can have the ability to modify certain aspects of this page. These aspects can include a league logo, a league title, a league description, a background image, a background color, league forums, a calendar of events (not necessarily tournament, but league based), a leader board and member listings. The league functionality can be based on the functionality built for the guilds within the inner circle social networking system.

The tournament functionality of the inner circle social networking system can be used by the administrator of the groups. The administrator can create public or private tournaments. Creation of this functionality can require information such as a tournament name, a description, a selected game, a game variation, a cut off time, a start time and number of entries. Prizes can be entered as squibbles. The administrator can be responsible for delivering any of the winner prizes. Additional information for creating a tournament can include whether the tournament is private or public and the tournament rules. A tournament can have its own chat room. The administrator can invite specific members. Members can receive notification when they join a tournament and again after the tournament begins. All features of the league page can be controlled by the league administrator and anyone the administrator may assign as fellow administrators. The administrators can be fully responsible for organizing and monitoring the tournament progress and winners.

A universal currency system can be provided within the inner circle social networking system. For example, squibbles can be a currency used throughout the inner circle social networking system for users to trade and purchase tangible goods. Squibbles can have a currency conversation and a monetary value. For example, one dollar may be used to purchase or may be the equivalent of one thousand (1000) squibbles. This can be a global variable controlled by the database. In one embodiment of the invention, squibbles are not earned. Rather, they can be gifted, purchased, or won through a tournament. Additionally, in one embodiment of the invention, users can purchase a package that includes a set amount of squibbles currency as part of the monthly membership fees, or it can be purchased separately. In addition, a user may purchase squibbles, for example 10,000 ($10USD), at a site store. The purchase of squibbles may be restricted to blocks of squibbles, for example squibbles may be available in blocks of 10,000. If a user has a recurring package, a set amount of squibbles can get added in every month to current balance of squibbles held by the user.

A parent can give child account squibbles directly. Additionally, a parent can gift squibbles for playing a game. When creating a game within the inner circle social networking system a determination can be made whether a parent is playing a child. If so the parent can be offered the option of designating a number of squibbles for winning, losing, or just playing. Parents can do this for single player games as well. For example, a child can receive 500 squibbles for playing words with friends.

Users can buy merchandise or premium games from the inner circle social networking system. Additionally, users can buy items using the online site shop. In a preferred embodiment, the user can make the purchases entirely or partially using squibbles. Any amounts not covered using squibbles can be paid via credit card, for example if the balance is not sufficient. The system shopping cart can keep track of amount of squibbles used to purchase used to make a perchance and the amount charged using a credit card.

Families can be permitted to join each other, thereby giving access to each other's walls and members. Members can be removed from the lists of any children by de-selecting them at any time. The de-selecting can be performed by the parents of the children. An example of a family linking for two families, thus creating an outer circle, is shown in the table below.

This is an example representation of how the database can store the linking information, as well as how the family member can manage it.

TABLE

|  | Adult1 | Adult2 | Child1 | Child2 |
|---|---|---|---|---|
| Joe | 1 | 1 | 1 | 1 |
| Dina | 1 | 1 | 1 | 1 |
| Bob(child1) | 0 | 0 | 1 | 0 |
| Frank(child2) | 0 | 0 | 0 | 1 |

The inner circle social networking system can provide universal user points and a ranking system. Simple pages can receive the game play statistics, and a game programmer can integrate the game into working with the pages provided by the system. The inner circle social networking system can create pre-load and post-game pages to gather any statistics that are available. The universal game ranking system can give an overall ranking to all users on the site. By default users can start with a ranking score of 1,500 points for a novice. Over a period of time, as users play the games, they can earn points towards the ranking, for example one win can generate 200 points. As the point totals grow the users can receive new titles based on their rankings. The new titles can then correspond to an icon next to their user name, which may lead to generating serious competition on the site.

As described, the inner circle social networking system can consist of three types of groups: family, public and private. All three kinds of groups can have access to its own wall for posting messages, its own forum, its photos, its own videos, its links, and a main administrator for the group. The duties of the administrator may be assigned to any adult in the group.

The family group, or inner circle, can be the initial group that is created when a user signs up. For instance, if Cary Bartlett signs up, his default group the Bartletts can be created. This group can have his wife and two sons. If Joe Raio signs up, his default group the Raios can include only him. If he is not married and does not set up any child accounts this group can remain with just him in it.

The league group can be the same thing as a public or private group except that it is based only around playing games. This designation can be used for organizational persons. A public group is a group that a member can start for other members with similar interests. For instance, Joe can start a Metallica group. Anyone on the site who finds this group and is a fan of Metallica can join and participate in the group. Private groups can be the same as the public groups, but require an invitation to join.

Site programming and development for the inner circle social networking system can be done in Visual Studio 2010 using Visual SourceSafe for version control. Microsoft VB.net and SQL Server 2008 R2 can also be used. Hosting can be done using Windows 2008 R2. While the foregoing are believed to provide reliable and scalable solutions for social networks, as well as many large-scale e-commerce companies, those skilled in the art will understand that other tools can be used.

Additionally, any suitable server setup can be used for the inner circle social networking system. In the preferred embodiment of the invention, the server setup selected should allow for rapid growth. The use of a content delivery network can ensure that the user receives the fastest possible download speeds when viewing any content. One possible configuration for the inner circle social networking system can be a web server, a database server and a content server. Such a setup can allow for significant traffic and growth when expansion is needed. When the usage of the initial servers is exceeded, third party hosted cloud partner such as Rackspace.com can be used.

A web user interface/interface design can include a home page, a profile page, a registration form, a user control panel, a user feed, a game play page, a game listings grid, category pages, a template for all static content pages, error messages, system notices, an administration area and reports.

Thus the system of the invention is social circle based. It can be implemented as a web site, as a standalone application, or any other ways know to those skilled in the art. At its core is an individual within their own personal social circle of one. In a preferred embodiment the personal social circle does not exist on its own, but is within an inner circle, with the exception of children, who cannot be within an inner circle without an adult parent and/or guardian, since a primary purpose of the system of the invention is to protect children. When two adult individuals with personal social circles decide to connect to each other, they can be merged into a common inner circle.

When two adult individuals decide to separate, they are separated into two distinct and separate inner circle social circles. Any children associated with the original joint inner circle social circle are moved into each of the newly created inner circle social circles. Each adult can then continue to provide parental controls for the child accounts within their newly created inner circle social circle. If children are not incorporated into an inner circle social circle structure, there are limitations on the uses and actions they are allowed limited by the strictest parental control default settings. From the inner circle social circle to all others forming a web of connections between some or all individuals grouped into a particular inner circle social circle.

The following description makes reference to the annexed drawings and sets forth in detail certain illustrative aspects of the invention. These aspects are indicative, however, of but a few of the various ways in which the principles of the invention may be employed, and the present invention is intended to include all such aspects and their equivalents. Other advantages and novel features of the invention will become apparent from the following detailed description of the invention when considered in conjunction with the drawings.

FIG. 1 shows interconnections of inner social circles forming an outer circle in accordance with one embodiment of the inner circle social networking system of the invention. Specifically, FIG. 1 illustrates three inner circles 103, 105, 107 created within the social network of the present invention, which together form an outer circle 101. Each inner circle functions as an entity or a private social network that includes a private wall, for example, that can only be accessed by members of that inner circle. The inner circle administrator can request a member of another inner circle to form a joint circle which may be referred herein as an outer circle. However, once members of inner circles form an outer circle, the outer circle construct just recognizes the individual members and does not recognize or identify inner circles per se. The outer circle has a separate private wall that is different from the private wall of an inner circle. Thus, a member of an inner circle can look and receive postings in the private wall of the inner circle and can also look and receive postings in the private wall of the outer circle in the event that that member has also decided to join the outer circle. A member of the social networking system of the present invention may also have contacts (or friends) that can post to a third type of wall that can only be accessed by that member. That is, a particular member can receive and read messages posted in three types of walls, with only members of the inner circle being able to see postings in the private wall corresponding to the inner circle, only members of the outer circle being able to see postings in the private wall corresponding to the outer circle, and contacts of that member being able to see postings in the wall corresponding to the friends of the member. In other embodiments of the invention, similar walls can be implemented for groups or leagues formed. In a preferred embodiment, each member can see the postings on the three types of walls through a news feed displayed by the system in a single screen.

Referring to FIG. 1, in circle 103 a father and a mother can both have a personal or private circle of friends, a process which is similar to creating connections or friends using websites such as Linkedin or Facebook, and in which in one embodiment one can only become friends with an existing user through invitation only. The father and the mother can also have an inner circle corresponding to the immediate family or household. This family 1 inner circle can be joined by two children whose accounts can either be created as subaccounts by either the father or the mother in that family 1 inner circle. The children in that family 1 circle inner circle are also allowed to create personal circles and add friends as described in this document, namely, through pre-approval of friends by the children's parents. In one embodiment of the invention, each member of a particular inner circle will share a private wall with other members of that inner circle and have conventional friend-like privileges.

In addition to circle 103 which includes members of a particular household, the network outer circle 101 can include extended family circles such as circle 105 and circle 107. For example, the circle 105 includes the paternal grandparents as members. In one common scenario, the paternal grandfather's personal circle is likely to include the father from circle 103 and vice versa. A different scenario is described with respect to FIG. 2 below.

Inner circle 107 corresponds to the immediate family of a sister of the Father in circle 103. Assuming that niece 1 and niece 2 in circle 107 are under age, then the process for allowing them to join inner circle 107 is the same or similar to the process for allowing the children to join circle 101 circle, namely, by the parent's creation of subaccounts. Likewise, the process for authorizing either niece to add friends to their personal circles is also the same or similar to the process explained above with respect to children 1 and 2 in circle 103.

Figure 2:
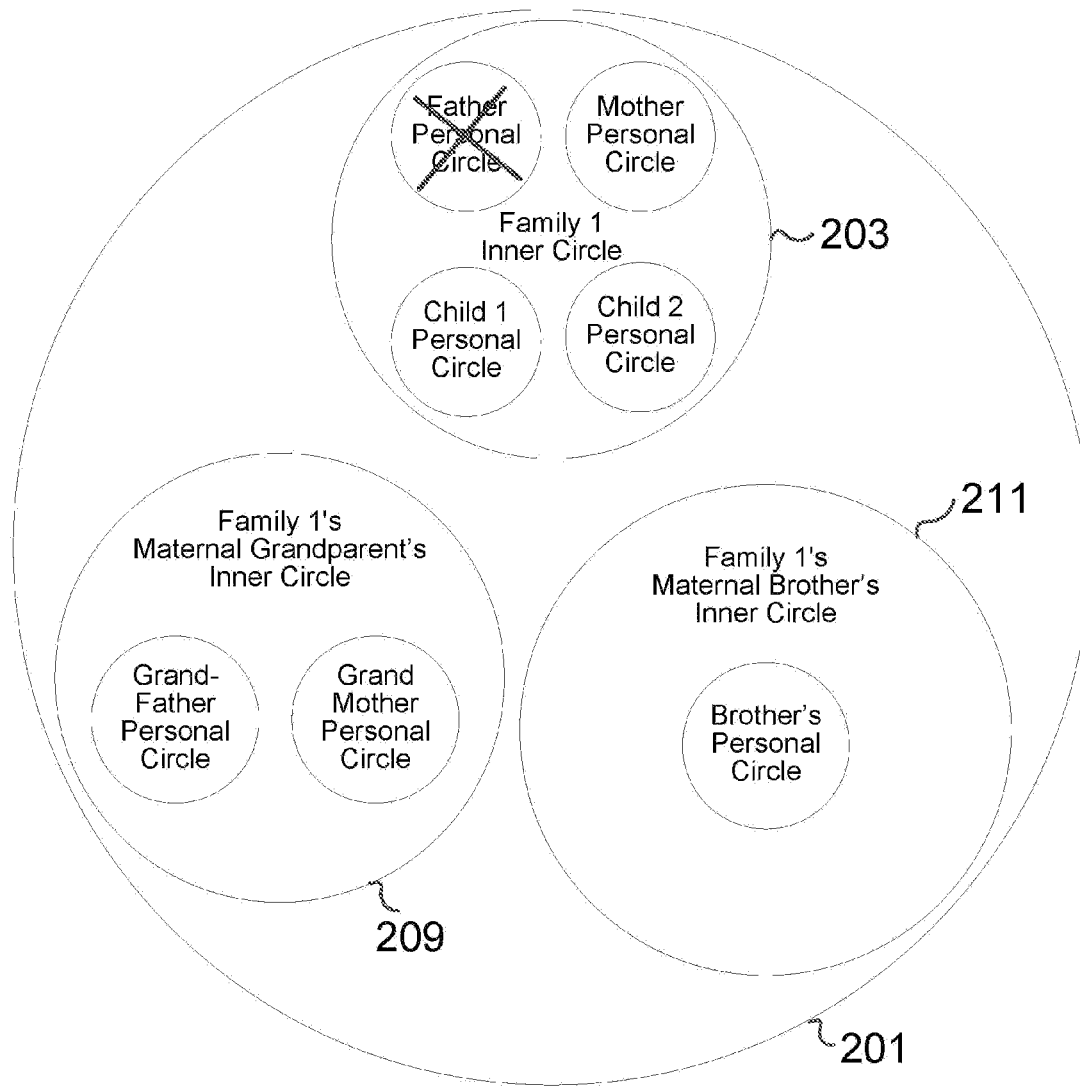
FIG. 2 shows interconnections of inner social circles forming an outer circle according to one embodiment of the inner circle social networking system of the invention.

FIG. 2 shows interconnections of inner social circles forming an outer circle according to one embodiment of the social circle networking system of the invention. Specifically, FIG. 2 illustrates three inner circles 203, 209, 211 linked to create outer circle 201 in accordance with one embodiment of the present invention. In the illustrated embodiment circle 203 may be identical to circle 103 FIG. 1. However, in the event that the father in circle 203 does not get along well with the in-laws, the father may choose not to participate in the outer circle social circle 201 that links the maternal grandparent's inner circle with circles 203 and 211. Thus, the father being crossed out in FIG. 2 only means that the father chose not to participate in the outer circle connection 201, which in turn means that he will not have access, for example, to postings on the wall corresponding to that outer circle 201 in accordance with one embodiment.

Further referring to FIG. 2, the outer circle 201 created does not recognize the existence of an inner circle but only includes as members a subset of the members to the three linked inner circles 203, 209 and 211: Mother, Child1, Child2, Grandfather, Grandmother, and Mother's Brother. The Father can have his brother-in-law as a Friend in his personal circle, but still exclude himself from participating in outer circle 201.

Figure 3:
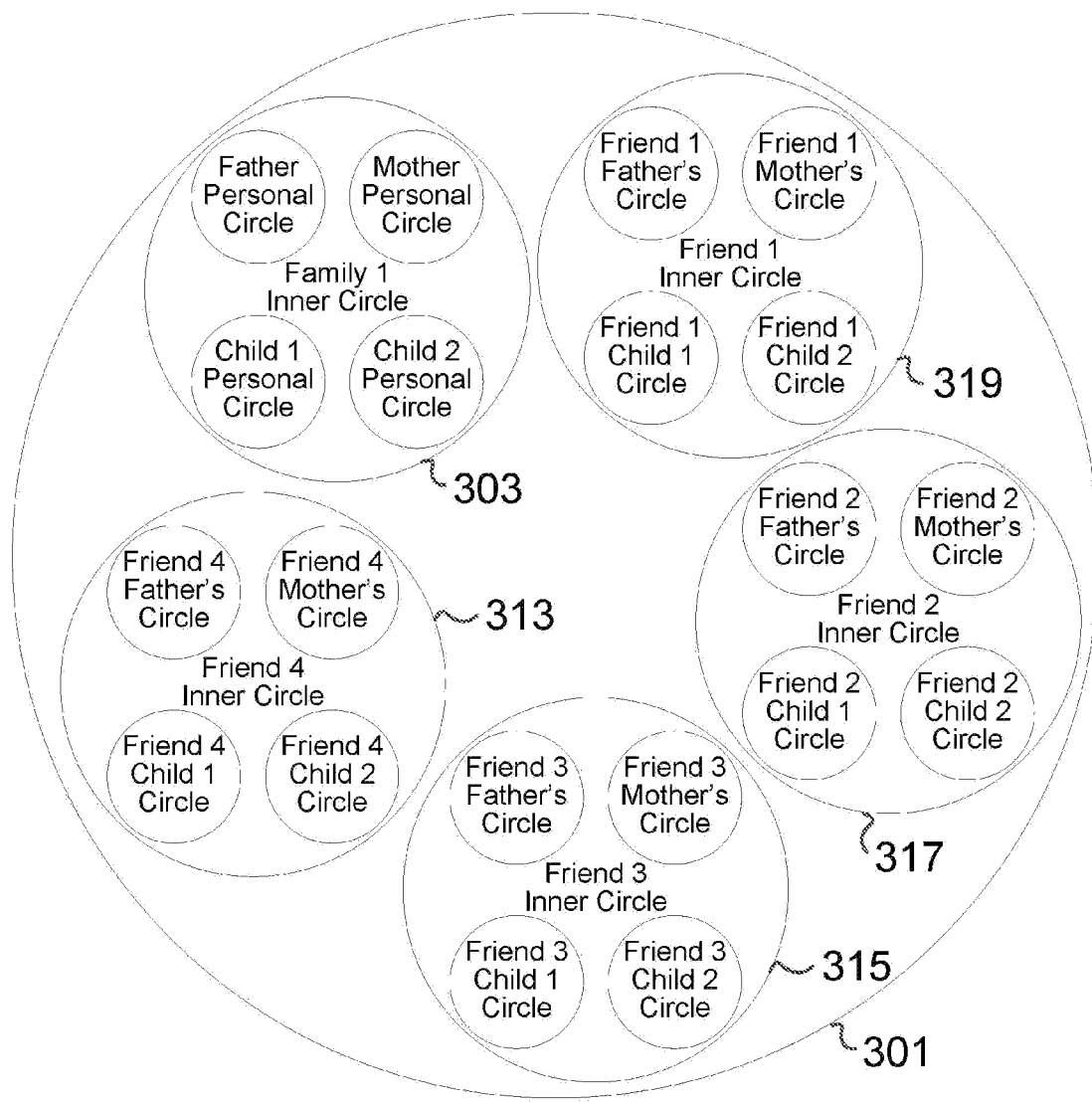
FIG. 3 shows interconnections of inner social circles forming an outer circle according to one embodiment of the inner circle social networking system of the invention.
Figure 4:
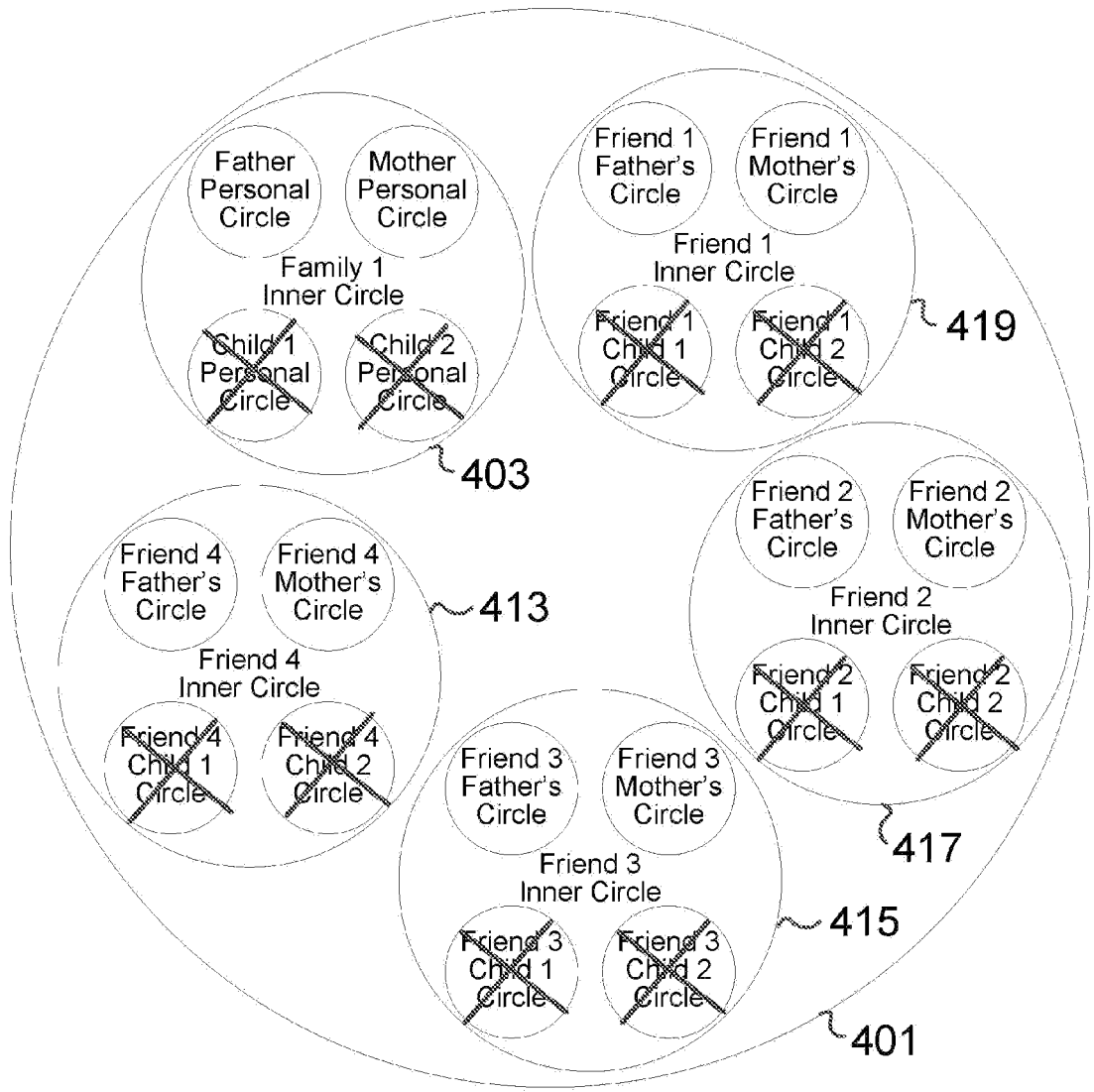
FIG. 4 shows interconnections of inner social circles forming an outer circle according to one embodiment of the inner circle social networking system of the invention.

FIG. 3 shows interconnections of inner social circles 303, 313, 319, 315, and 317 forming an outer circle 301 according to the inner circle social networking system of the invention. FIG. 4 shows an outer circle 401 which varies from outer circle 301 in FIG. 3 in that the parents in inner circles 403, 413, 415, 417, and 419 have decided to link those inner circles and create an outer circle 401 that excludes the children from the outer circle connection.

Figure 5:
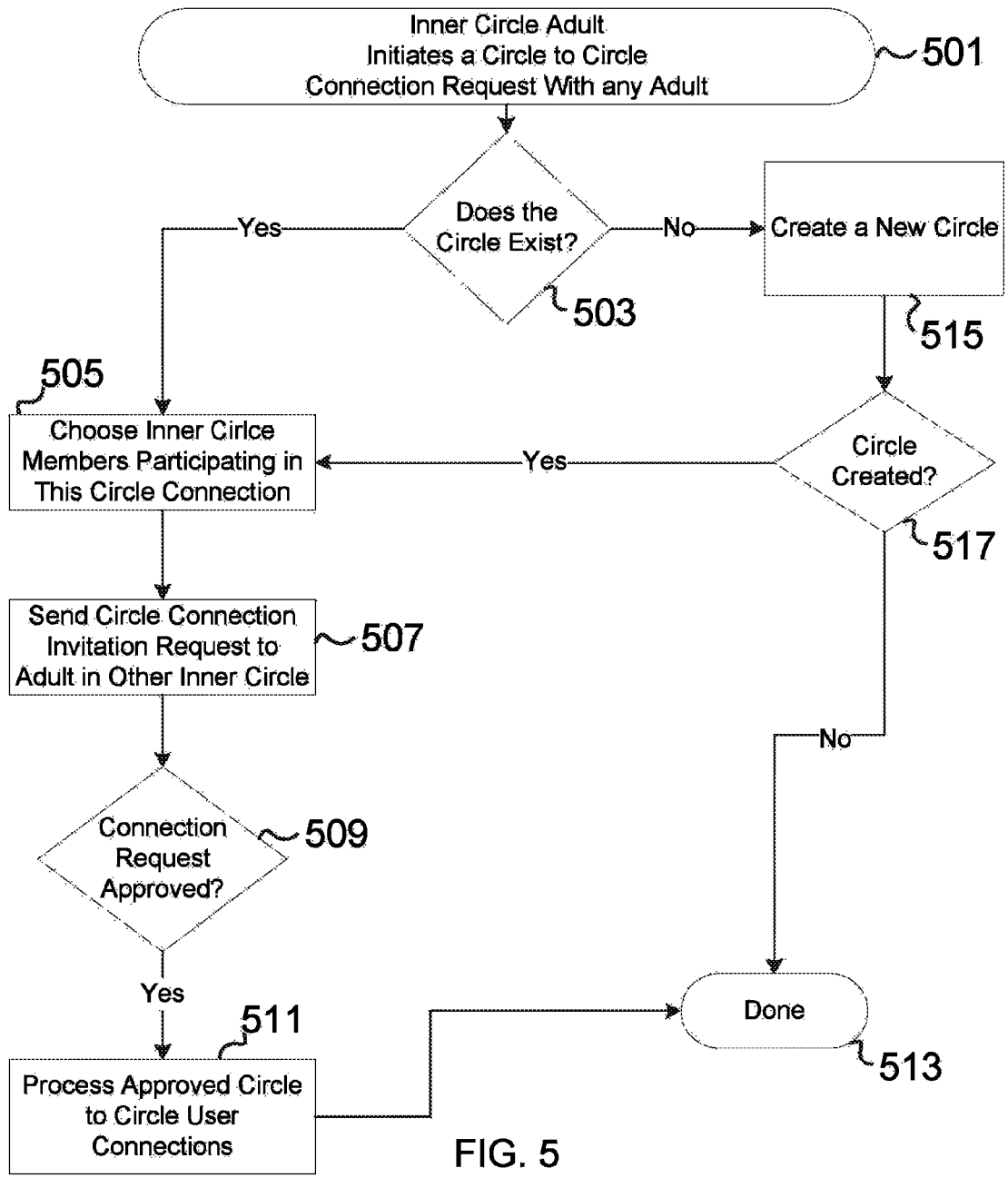
FIG. 5 shows a flow chart representation of a method for receiving and processing an inner circle to inner circle connection request initiated by an administrator, adult, or parent within the inner circle social networking system in accordance with one embodiment of the invention.

FIG. 5 shows a flow chart representation of a method for processing a circle to circle connection request initiated by an adult/parent user within the inner circle social networking system in accordance with one embodiment of the invention. At step 501 an adult from one inner circle initiates a process for requesting any other adult from another inner circle to create or join an outer circle. If that outer circle is a new circle and has not been created (step 503), then the system creates a new outer circle at step 515. The system then verifies that the outer circle has been created at step 517. If the outer circle cannot be created then the process ends at step 513. If either the outer circle exists or a new outer circle was created and verified (steps 515 and 517), then at 505 the requesting adult can select which members of his or her inner circle can participate in the outer circle connection. At step 507 an outer circle connection request or invitation is sent to the adult(s)/user(s) in the other/target inner circle. At step 509 it is determined whether the request has been approved by the adult receiving the request, and if so then at step 511 the system approves the inner circle to inner circle connections to form the outer circle. This process can be repeated for adding other inner circles to an existing outer circle connection.

Figure 6:
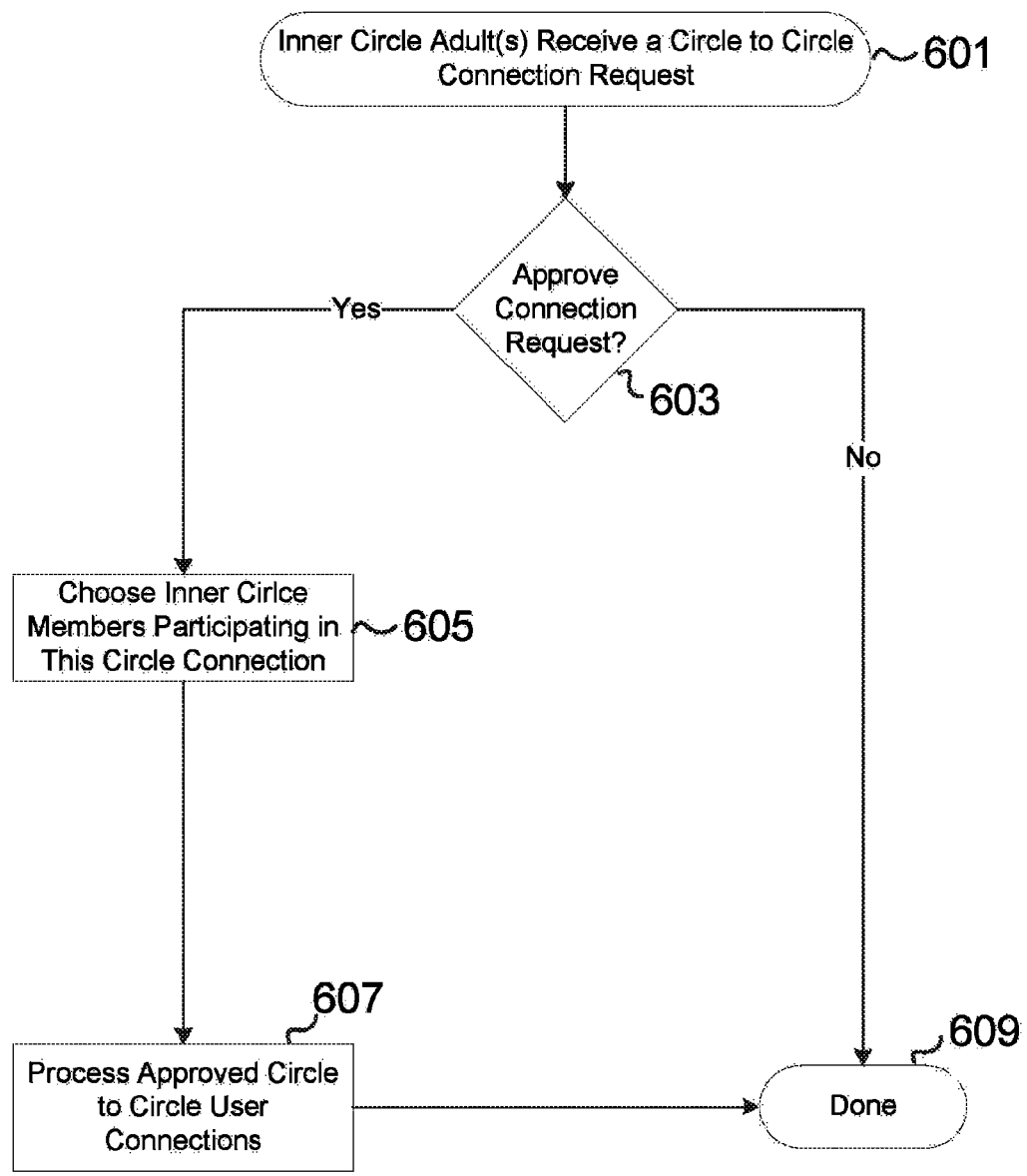
FIG. 6 shows a flow chart representation of a method for receiving and processing an inner circle to inner circle connection request within the inner circle social networking system in accordance with one embodiment of the invention.

FIG. 6 shows a flow chart representation of a method for processing a circle to circle connection request within the inner circle social networking system in accordance with one embodiment of the invention. Specifically, FIG. 6 illustrates the processing of the request sent at step 507 in FIG. 5. Referring to FIG. 6, at step 601 an adult user from an inner circle receives a request to join or form an outer circle. If the recipient of the request declines to join or form the outer circle (step 603) then the process ends at step 609. By contrast, if the recipient of the request decides to either join or create the outer circle, then that adult will choose members from his or her inner circle that can participate in the outer circle connection. At step 607 the system approves the inner circle to inner circle user connections.

Figure 7:
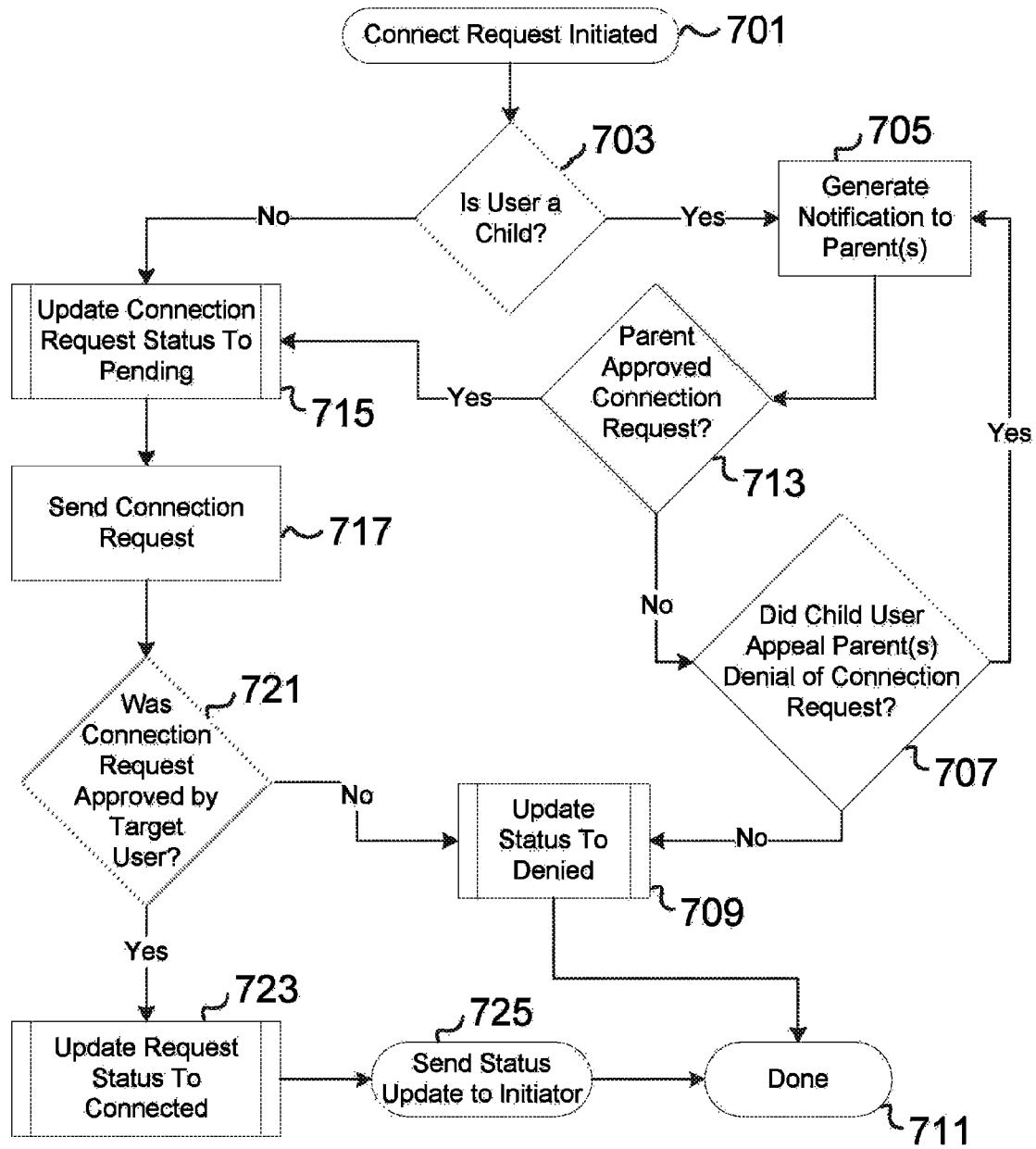
FIG. 7 shows a flow chart representation of a method for processing an initiated user to user connection request in accordance with one embodiment of the invention.

FIG. 7 shows a flow chart representation of a method for processing a connection request within the inner circle social networking system in accordance with one embodiment of the invention. At step 701 the request for a new user, friend, or connection is initiated. At step 703 the system determines whether the request was initiated by a child or an adult user. If the user is a child then at step 705 the system may generate a notification to the adult users of the inner circle of which the child is a member. At step 713 the system determines whether the adult user has approved the connection request. If the connection request is not approved by the adult user then at step 707 the system determines whether the child appealed the denial of the connection request. When the child appeals the request then a new notification is generated at step 705 for consideration by the parents. If the child does not appeal the denial, then the status of the connection request is updated to "denied" and the process ends at 711.

If the adult user approves the request initiated by the child or if the connection request is not initiated by a child, then at step 715 the system changes the status of the request to "pending," and at step 717 the connection request is sent to the target user or recipient of the connection request. If the request is denied at step 721, then the system at step 709 updates the status of the request to "denied." By contrast, if the target user approves the request at step 721, then at step 723 the system updates the status of the request to "connected" and at step 725 a status update notification is sent to the requesting user.

Figure 8:
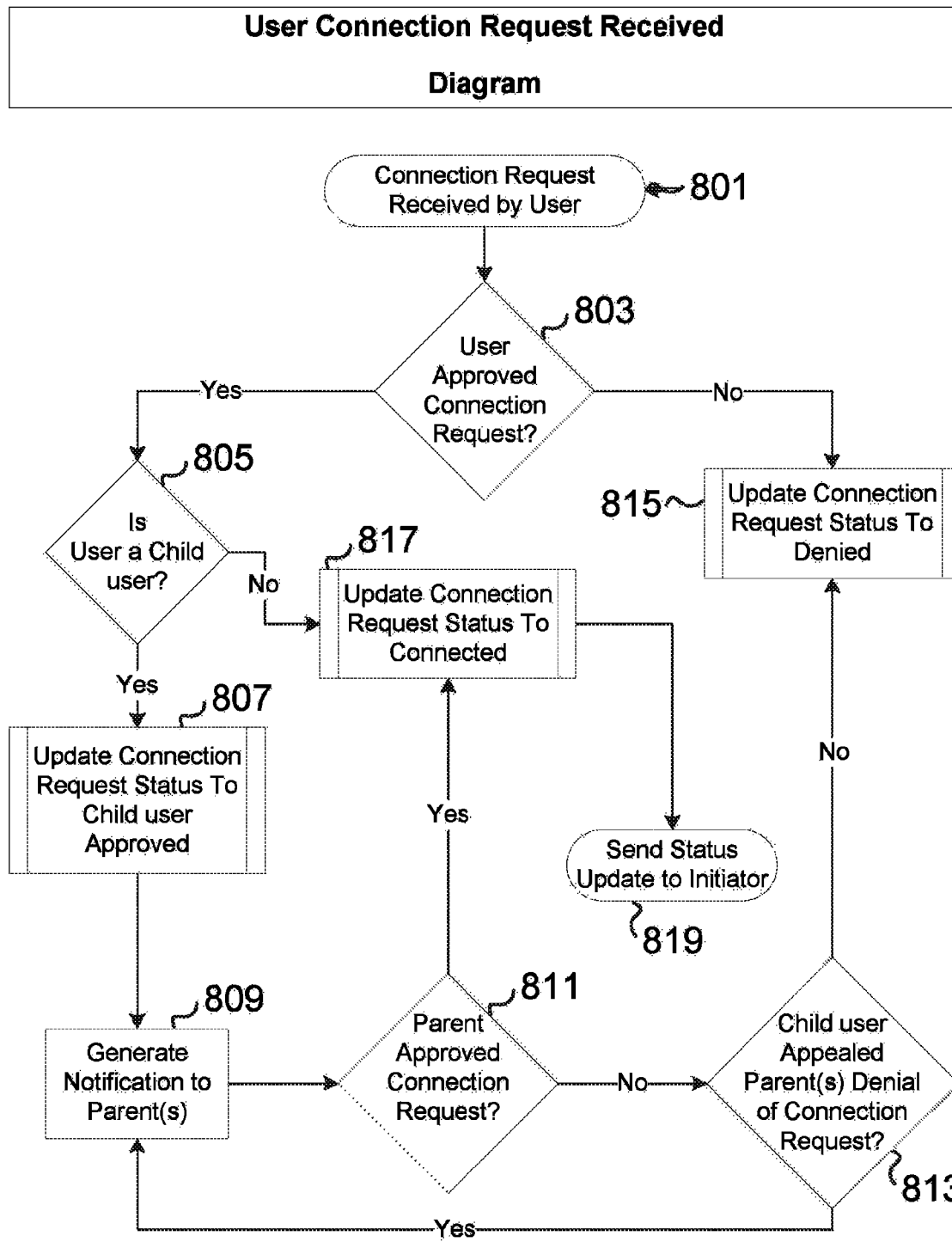
FIG. 8 shows a flow chart representation of a method for processing a received user to user connection request in accordance with one embodiment of the invention.

FIG. 8 shows a flow chart representation of a method for processing a connection request within the inner circle social networking system in accordance with one embodiment of the invention. Specifically, FIG. 8 illustrates the processing of the request sent at step 701 in FIG. 7. At step 801 the target user receives the request initiated at step 701 in FIG. 7. At step 803 the system determines whether the target user approved the connection request. If the target user denies the request, then at step 815 the system updates the status of the connection request to "denied." If the target user approves the connection request, then at step 805 the system determines whether the target user is a child. If the target user is not a child, then at step 817 the system updates the status of the connection request to "connected," and at step 819 a status update notification is sent to the requesting user.

If at step 805 the system determines that the target user is a child, then the system updates the connection status request to "child user approved." At step 809 a notification is generated to alert the parents that the child target user has approved a connection request. If the parent approves the connection request at step 811, then at step 817 the system updates the status of the connection request to "connected." If at step 811 the parent denies the connection request, then at step 813 the child has the option of appealing the denial of the request. When the child appeals the denial, then at step 809 another notification is sent to the parents alerting them of the appeal. If the child target user decides not to appeal the denial, then at step 815 the system updates the status of the connection request to "denied."

Figure 9:
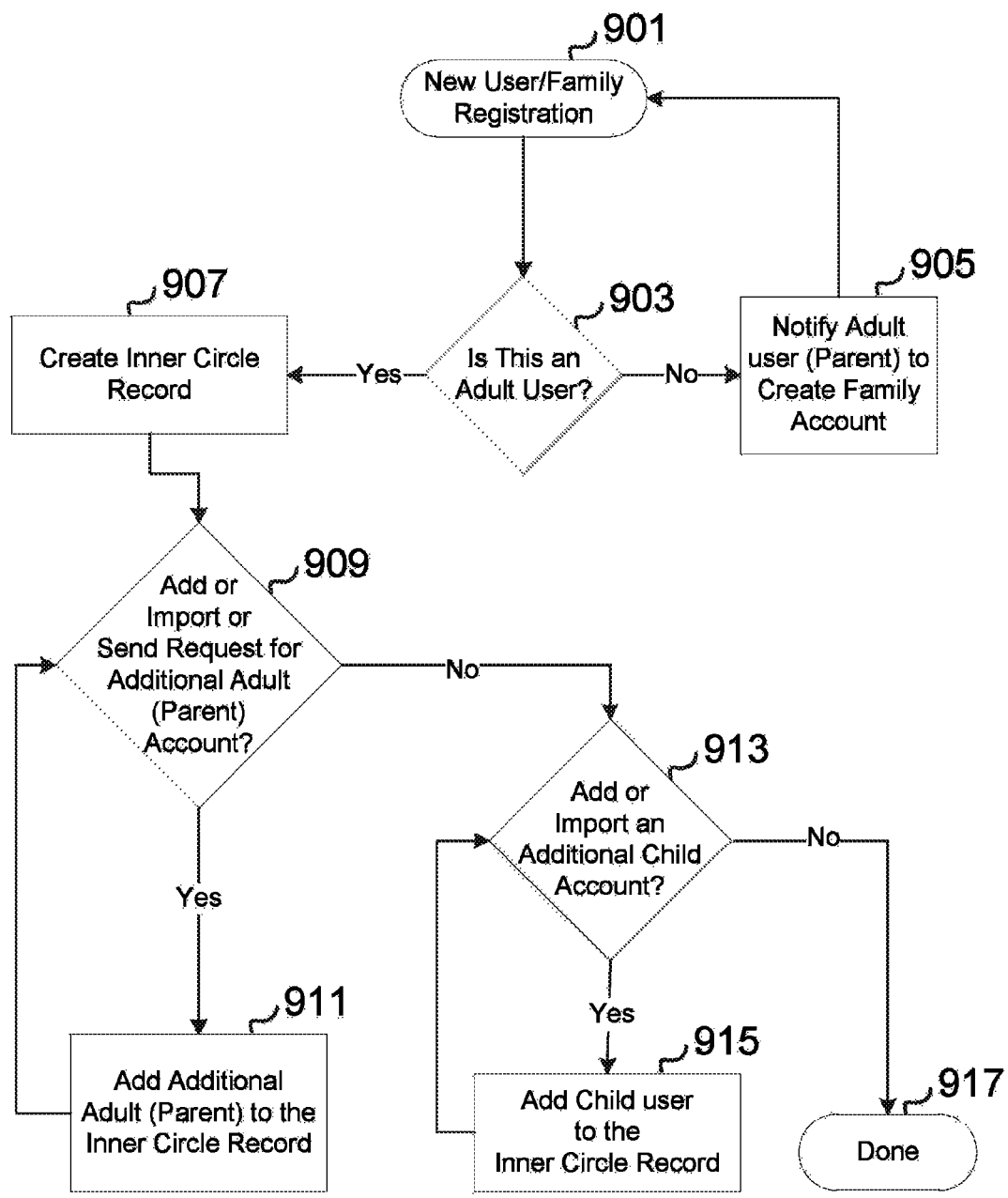
FIG. 9 shows a flow chart representation of a method for processing a new user/family registration within the inner circle social networking system in accordance with one embodiment of the invention.

FIG. 9 shows a flow chart representation of a method for processing a new user/family registration within the inner circle social networking system in accordance with one embodiment of the invention. In one embodiment, when a new adult user first creates an account, the system automatically designates that user as an account administrator of an inner circle. The adult user can choose to leave that inner circle and join an inner circle created by his or her partner. FIG. 9 illustrates the process for registration of an inner circle in accordance with one embodiment of the present invention.

At step 901 a new user requests the system to create a new inner circle. At step 903 the system determines whether the requester is an adult user. If the requester is underage, then the system at step 905 notifies the parent that he or she must create an inner circle. If the system at step 903 determines that the requester is an adult, then at step 907 the system proceeds to create an inner circle record. At step 909 the system determines whether the new user has requested to add an additional adult account, and if that is the case, then at step 911 the system adds a new adult to the inner circle record and the new user is asked again whether another adult should be added to the inner circle at step 909.

In the event that the requesting adult or user does not want to add any other adult to the inner circle, then at step 913 the system determines whether the requesting adult desires to register a child with the inner circle. If a child is to be added, then at step 915 the system adds the child information to the inner circle record and then at step 913 the requesting adult is asked again if another child is to be registered with the inner circle. The registration process ends at step 917.

Figure 10:
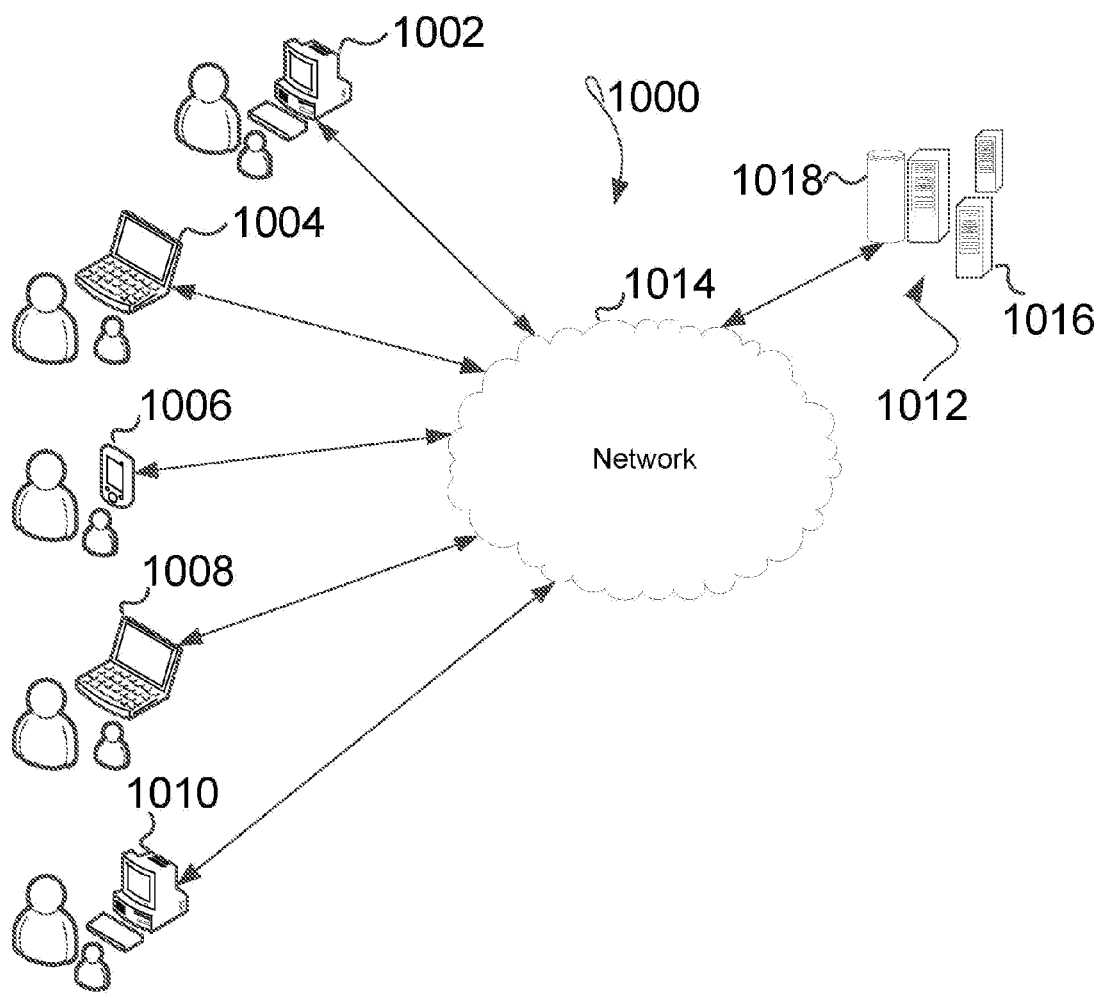
FIG. 10 shows a diagram of an exemplary network architecture for use in a social network system.

FIG. 10 is a diagram of an exemplary network architecture 1000. The network architecture 1000 includes a number of client devices 1002-1010 communicably connected to a server system 1012 by a network 1014. The server system 1012 includes one or more processing devices 1016 and one or more data store 1018. The processing device 1016 executes computer instructions (e.g., social network computer program code) stored in the data store 118 to perform functions of a social network server. Users of the client devices 1002-1010 access the server system 1012 to participate in a social networking service. For example, the client devices 1002-1010 can execute web browser applications that can be used to access the social networking service. In another example, the client devices 1002-1010 can execute software applications that are specific to the social network (e.g., social networking "apps" running on smartphones).

Users interacting with the client devices 1002-1010 can participate in the social networking service provided by the server system 1012 by distributing digital content, such as text comments (e.g., updates, announcements, replies), digital photos, videos, or other appropriate electronic information. In another example, a software application executing on a mobile device, with proper permissions, may use global positioning system (GPS) capabilities to determine the user's location and automatically update the social network with his location (e.g., "At Home", "At Work", etc.). Users interacting with the client device 1002-1010 can also use the social networking service provided by the server system 1012 to define inner and outer circles to organize and categorize the user's relationships to other users of the social networking service as described in this disclosure. In some implementations, the client devices 1002-1010 can be computing devices such as laptop or desktop computers, smartphones, personal digital assistants, portable media players, tablet computers, or other appropriate computing devices that can be used to communicate with an electronic social network. In some implementations, the server system 1012 can include one or more computing devices such as a computer server. In some implementations, the server system 1012 can represent more than one computing device working together to perform the actions of a server computer (e.g., cloud computing). In some implementations, the network 1014 can be a public communication network (e.g., the Internet, cellular data network, dialup modems over a telephone network) or a private communications network (e.g., private LAN, leased lines)

While the invention has been described in detail and with reference to specific examples thereof, it can be apparent to one skilled in the art that various changes and modifications can be made therein without departing from the spirit and scope thereof. The foregoing description of possible implementations consistent with the present invention does not represent a comprehensive list of all such implementations or all variations of the implementations described. The description of only some implementation should not be construed as an intent to exclude other implementations. Artisans will understand how to implement the invention in many other ways, using equivalents and alternatives that do not depart from the scope of the following claims. Moreover, unless indicated to the contrary in the preceding description, none of the components described in the implementations are essential to the invention.

The invention claimed is:

1. A system comprising: one or more computing devices; and one or more computer-readable media coupled to the one or more computing devices and having instructions stored thereon which, that when executed by the one or more computing devices, cause the one or more computing devices to perform operations comprising:

transmitting contact data for displaying graphical representations of contacts for display to a first user, the contacts being contacts of the first user within a private circle in a computer-implemented social networking service;

generating a first inner social circle corresponding to said first user, the first inner social circle comprising a first subset of contacts of the first user within the social networking service and defining a first distribution for digital content within that first inner social circle;

creating a sub-account upon direction from said first user, said sub-account corresponding to a second user, said sub-account being managed by commands received from said first and second users;

wherein said second user becomes a member of said first inner social circle based on the second user being a sub-account;

transmitting contact data for displaying graphical representations of contacts for display to a third user, the contacts being contacts of the third user within a private circle in a computer-implemented social networking service;

generating a second inner social circle corresponding to said third user, the second inner social circle comprising a first subset of contacts of the third user within the social networking service and defining a second distribution for digital content within that second inner social circle;

creating a sub-account upon direction from said third user, said sub-account corresponding to a fourth user, said sub-account being managed by commands received from said third and fourth users;

wherein said fourth user becomes a member of said second inner social circle based on the fourth user being a sub-account;

receiving a request from said second user for said fourth user to join a second user's private network;

upon determining both the second and fourth users are sub-accounts:

transmitting said request to said first user for review;

receiving from said first user an approval notification to send said request to join said second user's private network to said second user;

transmitting said request to join said second user's private network to said third and fourth users for review;

receiving from said fourth user or said third user an approval notification to join said second user's private network based on a pre-approval by said third user;

adding said fourth user to said second user's private network;

transmitting contact data for displaying graphical representations of contact information corresponding to said fourth user for display to the second user;

receiving a request from said first user directed to said third user to link the first and second inner social circles to form an outer social circle;

transmitting to said third user said request to form an outer social circle;

receiving from said third user approval to link said first and second social circles;

and linking said first and second inner social circles to form said outer social circle.

2. The system of claim 1, further comprising transmitting to said third user form data with options to exclude members from said second inner circle from said outer social circle.

3. The system of claim 2, wherein receiving from said third user approval to link said first and second social circles includes receiving an indication of which members of said second inner social circle can be linked and become members of the outer social circle.

4. The system of claim 1, further comprising transmitting data to said first user corresponding to a first wall for displaying postings corresponding to said first inner social circle and to a second wall for displaying postings corresponding to said outer social circle.

5. The system of claim 4, wherein said data corresponding to said first and second walls is structured as news feed notifications.

6. The system of claim 1, wherein said second and fourth user accounts are defined based on an age of said second and fourth users.

7. The system of claim 6, wherein said second and fourth users are under the age of eighteen.

8. A method comprising: transmitting contact data for displaying graphical representations of contacts for display to a first user, the contacts being contacts of the first user within a private circle in a computer-implemented social networking service;

generating a first inner social circle corresponding to said first user, the first inner social circle comprising a first subset of contacts of the first user within the social networking service and defining a first distribution for digital content within that first inner social circle;

creating a sub-account upon direction from said first user, said sub-account corresponding to a second user, said sub-account being managed by commands received from said first and second users;

wherein said second user becomes a member of said first inner social circle based on the second user being a sub-account;

transmitting contact data for displaying graphical representations of contacts for display to a third user, the contacts being contacts of the third user within a private circle in a computer-implemented social networking service;

generating a second inner social circle corresponding to said third user, the second inner social circle comprising a first subset of contacts of the third user within the social networking service and defining a second distribution for digital content within that second inner social circle;

creating a sub-account upon direction from said third user, said sub-account corresponding to a fourth user, said sub-account being managed by commands received from said third and fourth users;

wherein said fourth user becomes a member of said second inner social circle based on the fourth user being a sub-account;

receiving a request from said second user for said fourth user to join a second user's private network;

upon determining both the second and fourth users are sub-accounts:

transmitting said request to said first user for review;

receiving from said first user an approval notification to send said request to join said second user's private network to said second user;

transmitting said request to join said second user's private network to said third and fourth users for review;

receiving from said fourth user or said third user an approval notification to join said second user's private network based on a pre-approval by said third user;

adding said fourth user to said second user's private network;

transmitting contact data for displaying graphical representations of contact information corresponding to said fourth user for display to the second user;

receiving a request from said first user directed to said third user to link the first and second inner social circles to form an outer social circle;

transmitting to said third user said request to form an outer social circle;

receiving from said third user approval to link said first and second social circles;

and linking said first and second inner social circles to form said outer social circle.

9. The method of claim 8, further comprising a step of transmitting to said third user form data with options to exclude members from said second inner circle from said outer social circle.

10. The method of claim 9, wherein the step of receiving from said third user approval to link said first and second social circles includes receiving an indication of which members of said second inner social circle can be linked and become members of the outer social circle.

11. The method of claim 8, further comprising a step of transmitting data to said first user corresponding to a first wall for displaying postings corresponding to said first inner social circle and to a second wall for displaying postings corresponding to said outer social circle.

12. The method of claim 11, wherein said data corresponding to said first and second walls is structured as news feed notifications.

13. The method of claim 8, wherein said second and fourth user accounts are defined based on an age of said second and fourth users.

14. The method of claim 13, wherein said second and fourth users are under the age of eighteen.

* * * * *